United States Patent [19]

Mesnel et al.

[11] Patent Number: 5,040,333

[45] Date of Patent: Aug. 20, 1991

[54] MOVABLE FLUSH-GLASS SYSTEM FOR AN AUTOMOBILE DOOR

[75] Inventors: François Mesnel, Neuilly-Sur-Seine; Géard Mesnel, Caarrieres-Sur-Seine, both of France

[73] Assignee: Establissements Mesnel, Carrieres-Sur-Seine, France

[21] Appl. No.: 470,111

[22] Filed: Jan. 25, 1990

[30] Foreign Application Priority Data

Jan. 27, 1989 [FR] France ................. 89 01054

[51] Int. Cl.⁵ .............................................. E06B 1/04
[52] U.S. Cl. ...................................... 49/374; 49/440; 49/491
[58] Field of Search ................. 49/374, 376, 378, 436, 49/437, 438, 439, 440, 441, 502, 490, 491, 222

[56] References Cited

U.S. PATENT DOCUMENTS

| | | | |
|---|---|---|---|
| 3,699,718 | 10/1972 | Kimura | 49/491 |
| 4,240,227 | 12/1980 | Hasler et al. | 49/440 X |
| 4,454,688 | 1/1984 | Rest et al. | 49/374 X |
| 4,457,109 | 7/1984 | Royse | 49/374 |
| 4,598,497 | 7/1986 | Digiusto et al. | 49/374 |
| 4,604,830 | 8/1986 | Maeda et al. | 49/374 |
| 4,608,779 | 9/1986 | Maeda et al. | 49/374 |
| 4,783,931 | 11/1988 | Kirkwood | 49/491 X |
| 4,875,307 | 10/1989 | Barbero | 49/440 X |

Primary Examiner—Philip C. Kannan
Attorney, Agent, or Firm—Scully, Scott, Murphy & Presser

[57] ABSTRACT

The invention relates to a movable flush-glass system (3) for an automobile door comprising two metal panels (1) which are fixed to one another and between which this movable glass can be retracted, and a glass frame obtained from the said panels or fixed to these, this frame defining with the panels an aperture intended to be closed off by the movable glass and comprising, on the sides of the aperture other than that on which the glass can be retracted between the panels, a rebate (5) projecting in the direction of the aperture.

According to the invention, on the inner face of the pane (3) there is a guide element (20) capable of capping an elastomeric section (6) which caps the rebate (5).

17 Claims, 4 Drawing Sheets

MOVABLE FLUSH-GLASS SYSTEM FOR AN AUTOMOBILE DOOR

The present invention relates to a flush-glass system, especially for an automobile door.

It is known that the generalization of automobile doors composed of two stamped panels, one external and the other internal, joined together by welding, especially on the periphery of the glasses, has brought about a change in the means of guidance, sliding and sound insulation of movable glasses.

The development of bodies on which the air streams flow along the external surfaces, thereby causing the least turbulence possible in order to increase the coefficient Cx of vehicle penetration in the atmosphere, has likewise prompted the manufacturers to review the glass systems of automobile doors and preferably provide movable glasses which are flush with the outer face of the door and which are therefore called "flush" glasses.

To assist the desired flushness of the glass, without a substantial modification of the construction of the body, and to reduce appreciably the road and air noises coming from outside when the vehicle is travelling at high speed, the applicant has already proposed equipping automobile doors with double-glass systems which are the subject of his French Patent Applications no. 2,604,660 and no. 2,604,661.

An essential characteristic of this system is that the double glass slides on the rebate which borders the door aperture and which is obtained as a result of the manufacture of the latter, whereas conventionally the glass slides in a guide element so as to be concealed completely in it in a closed position.

With such a glass system, because of the use of double panes it is possible to arrange the outer pane substantially in the plane of the external panel of the door, thus considerably improving the aerodynamic characteristics of the vehicle.

In order to reduce the cost of such double-paned movable flush-glass systems, the applicant, in his French Patent Application no. 88.02232 of 24th Feb. 1988, also proposed using a single pane, to the inner face of which is fastened, in the vicinity of its periphery, a continuous rigid element forming a frame attached to the pane, this rigid element having such a form and/or being so fastened that it defines, with the contiguous portions of the periphery of the pane, a channel of U-shaped cross-section intended for capping the rebate of the window frame in order to ensure the guidance and sealing closure of the glass.

Such a system has proved highly practical in use, but it has the disadvantage, when a window of a front door is partially lowered, that the upper part of the frame attached to this window pane is visible and risks coming into the field of vision of the driver, annoying him when he is looking at the corresponding exterior rear-view mirror.

The object of the present invention is to overcome this disadvantage by substituting for the continuous frame attached to the pane a simple lateral element arranged on the inner face of the pane, in the upper part of the latter, along a side corresponding to a vertical member of the window frame.

The subject of the invention is, therefore, a movable flush-glass system for an automobile door comprising two metal panels which are fixed to one another and between which this movable glass can be retracted, and a glass frame obtained from the said panels or fixed to these, this frame defining with the panels an aperture intended to be closed off by the movable glass and comprising, on the sides of the aperture other than that on which the glass can be retracted between the panels, a rebate projecting in the direction of the aperture, this glass system being characterized in that there is fastened to the inner face of the pane, in the vicinity of an edge of the latter contiguous with a vertical member of the frame and substantially level with the upper edge of this pane, at least one rigid element having such a form and/or being so fastened to the pane that it defines, with the contiguous portion of the periphery of the pane, a channel of U-shaped cross-section intended for capping an elastomeric section which itself caps the rebate of the door frame, in order laterally to ensure the guidance and sealing closure of the pane, whilst the edge of this pane, at least in the upper part of the latter, is arranged obliquely relative to its faces, thus forming an acute angle with the inner face, opposite a part of the section against which it comes to bear in the closing position.

In practice, the edge of the pane will have the same profile along all the sides corresponding to the rebate of the window frame, and the section will have, along all these sides, a part on which this edge will bear in the closing position. This part of the section will have, for example, a tubular cross-section, so as to be capable of deformation when stressed by the edge of the pane, in such a way as to ensure better sealing. This part of the section can also be made of a material capable of deforming under the stress of the pane. It can also simply have a profile complementary with the edge of the pane.

The outer surfaces of the part of the section intended for coming in contact with the pane will preferably be covered with a film of a material of low coefficient of friction, a fabric or flocked fibers, in order to make it easier for the pane to slide in contact with the section.

In a way known per se, the section will have a metal reinforcement embedded at least partially in the elastomer. Advantageously, to ensure the guidance of the pane during its movement, this section will be equipped, on the side located towards the inside of the vehicle, with a member which forms a slideway and in which a part of the corresponding rigid element or a shoe integral with this element will be engaged so as to slide freely therein. The member forming a slideway can be fastened to the section by any means known in the art. In particular, it can have a sole piece snapped into grooves of the section.

Of course, the pane and the section involved in the composition of the movable flush-glass system according to the invention are other subjects of the invention.

The accompanying drawings, which are not of any limiting character, illustrate embodiments of the invention. In these drawings.

Figures 1, 2A, 2B:
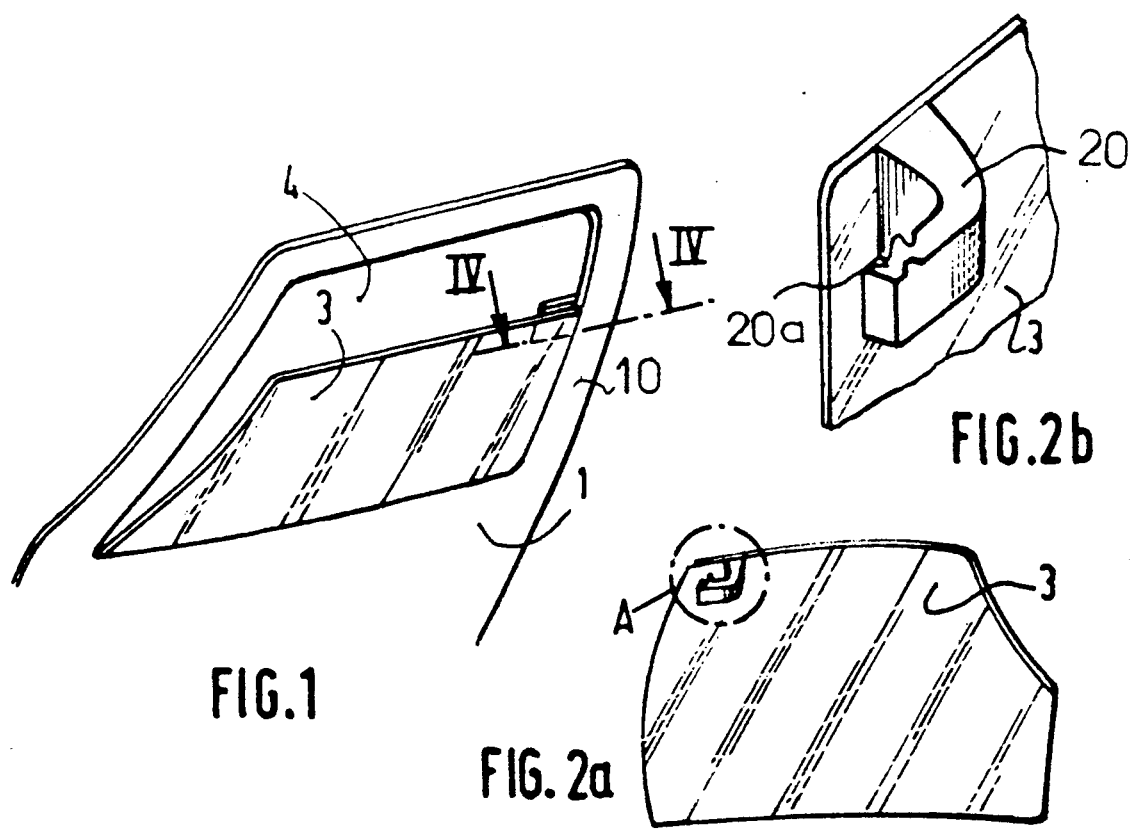
FIG. 1 is a diagrammatic perspective view of the exterior of an automobile door equipped with the movable flush-glass system according to the invention.
FIG. 2a is a diagrammatic elevation view of the glass of this door.
FIG. 2b is a partial view of the interior on a larger scale, showing the glass of this door.

The door illustrated in FIG. 1 comprises two stamped panels joined together, such as 1, between which a glass 3 can be retracted in a known way. The panels of the door are cut out to define an aperture 4 which the glass 3 closes off when in the raised position. The frame of this aperture is obtained as a result of the welding of the panels, to form a rebate 5, to which an elastomeric section 6 having a metal reinforcement 7 embedded in the elastomer is fixed. A part 8 of U-shaped cross-section of this section caps the rebate 5, to which it is fixed by means of tongues 9 projecting in the direction of this rebate from at least one of the branches of the U. The door frame has a substantially vertical member 10.

According to the invention, the glass 3 possesses, fastened to the inner face in the vicinity of its upper edge and of the vertical member 10 of the door frame, at least one element 20 of L-shaped cross-section, part of which is substantially parallel to the glass 3 and defines, with the peripheral edge of the latter, a channel of U-shaped cross-section, in which the rebate 5 and the section 6 capping it are engaged.

At least along its upper edge as far as the element 20 (and, in the drawing, over its entire periphery) the edge 11 of the glass is bevelled obliquely relative to the lateral faces, thus forming an acute angle with the inner face, and in the closed position it comes to bear in a part 21 of complementary form of the section 6, adjacent to the branch of the U-shaped part 8 facing towards the outside of the vehicle. The surface of this part 21 intended for coming in contact with the glass is covered with a film 12 of a material of low coefficient of friction or a fabric or even flocked fibers, in order to make it easier for the glass to slide. To allow the deformation of the part 21 of the section against which the glass bears, this part will advantageously have a tubular recess 22.

In order to ensure guidance when the glass is in the high position, that part of the L-shaped element 20 parallel to the glass 3 has an end 20a which is profiled in the form of a shoe and which is engaged in a slideway 14 of complementary form so as to be capable of sliding therein. This slideway 14 possesses a sole piece 23 snapped into grooves 25 of a part 19 of the section 6 adjacent to the part 8 of U-shaped cross-section. This part 19 has itself a profile in the form of a U upturned in relation to the part 8, and the sole piece 23 of the slideway 14 is snapped into the base of this U-shaped part 19. The slideway 14 could, of course, be fastened to the section by any other means, and the element 20 can be mounted slidably relative to the slideway in many other materials (sic).

The upper part of the section 6 corresponding to the top part of the glass 3 is, of course, free of a slideway. In the present case, the part adjacent to that branch of the U-shaped part 8 facing towards the inside of the vehicle has a tubular cross-section 25, but of course it could have any other form.

In a way known per se, the section 6 has a lip 16 which wipes the inner face of the glass 3. This lip 16 and the adjacent part of the section have flocked fibers 17 on their surface.

Figure 3:
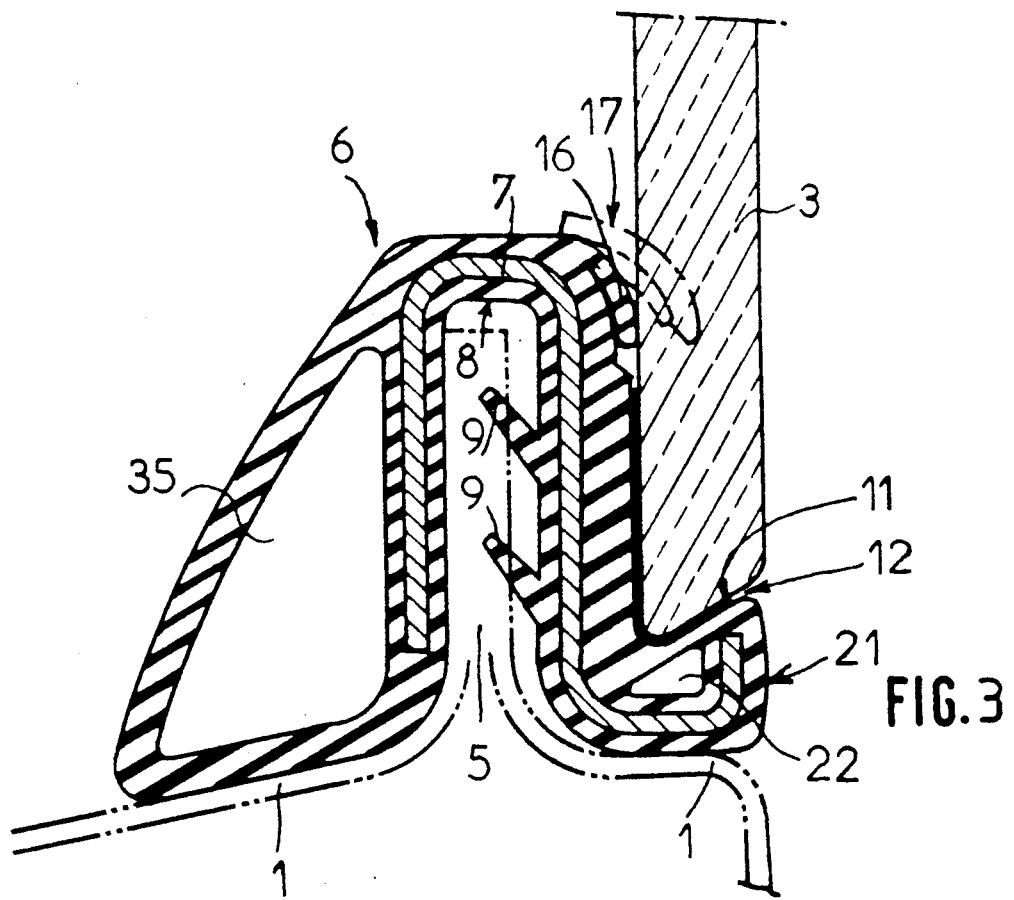
FIG. 3 is a section through the closed glass in the region of the upper member of the window frame.
Figure 5:
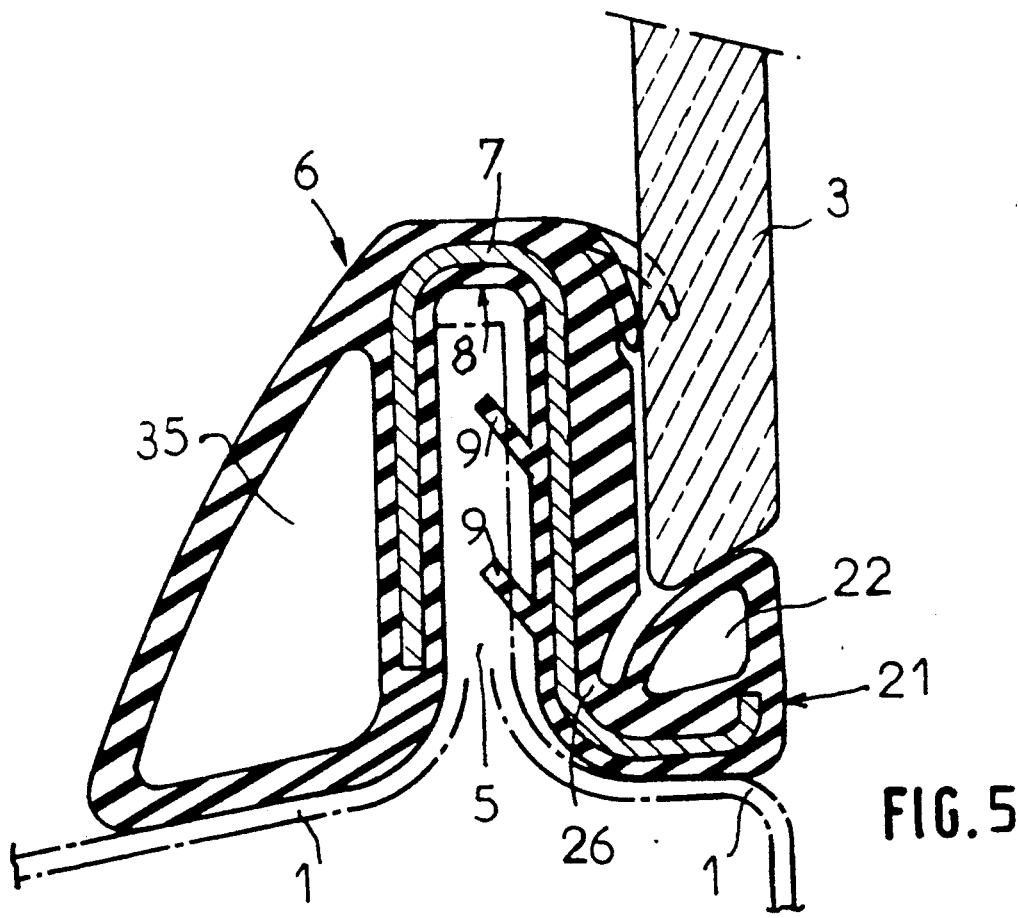
FIGS. 5 and 6 are views, similar to that of FIG. 3, of two other embodiments of the invention.

The alternative version of FIG. 5, where the members already described keep the same reference numerals, differs from the embodiment of FIG. 3 simply in that, to be capable of deforming more easily and thus compensating the wide body production tolerances, the part 21 of the section 6 possesses a tubular recess 22 of larger cross-section than before and is connected to the contiguous branch of the U-shaped part 8 of the section by means of a flexible part 26 forming a hinge.

Figure 6:
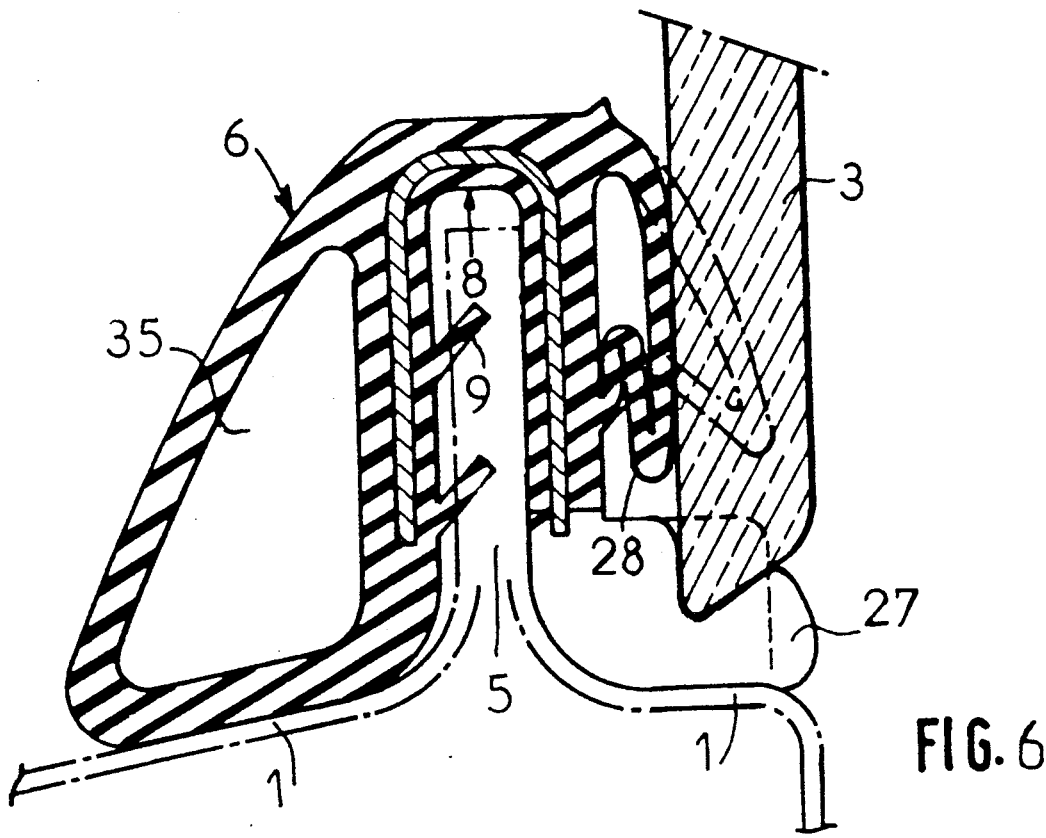

In the alternative version of FIG. 6, where the members already described are likewise designated by the same reference numerals, the part 21 of FIG. 5, on which the glass 3 bears, is replaced by a part 27 which is made of expanded plastic and which can thereby deform under the stress of the glass. In this alternative version, that branch of the U-shaped part 8 of the section contiguous with the glass stresses the latter outwards by means of a nose-shaped tubular part 28.

Figure 4:
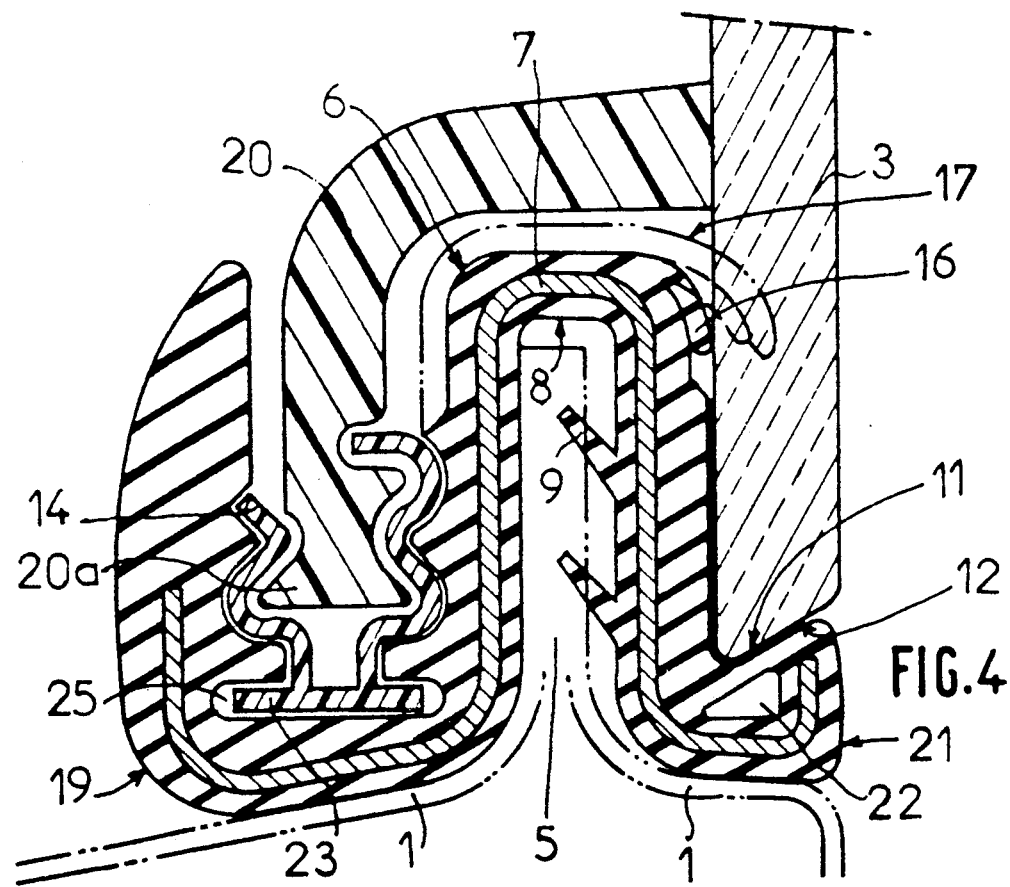
FIG. 4 is a section along the line IV—IV of FIG. 1.
Figure 7:
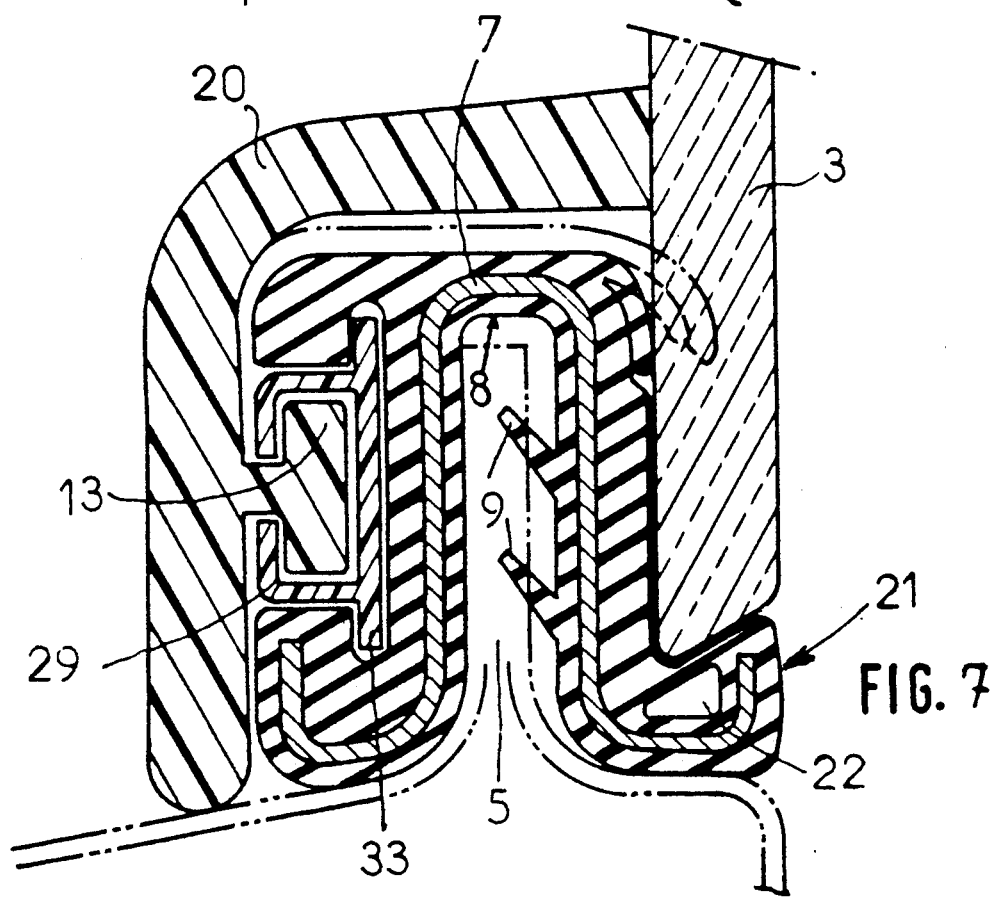
FIGS. 7, 8 and 9 are views, similar to that of FIG. 4, of three other embodiments of the invention.

FIG. 7 is a section, similar to that of FIG. 4, through another alternative version of the invention. In this figure, the members already described likewise keep the same reference numerals. In this alternative version, the element 20 of L-shaped cross-section possesses, on its face confronting the glass, an appendage 13 of T-shaped cross-section which forms a guide shoe and which is engaged, so as to be slidable there, in a slideway 29 of complementary profile, fixed to that branch of the U-shaped part of the section 6 facing towards the inside of the vehicle. The slideway 29 can be fastened to the section 6 by any means known in the art. In the example of the drawing, this slideway has a sole piece 33, the ends of which are snapped into grooves of the section.

Figure 8:
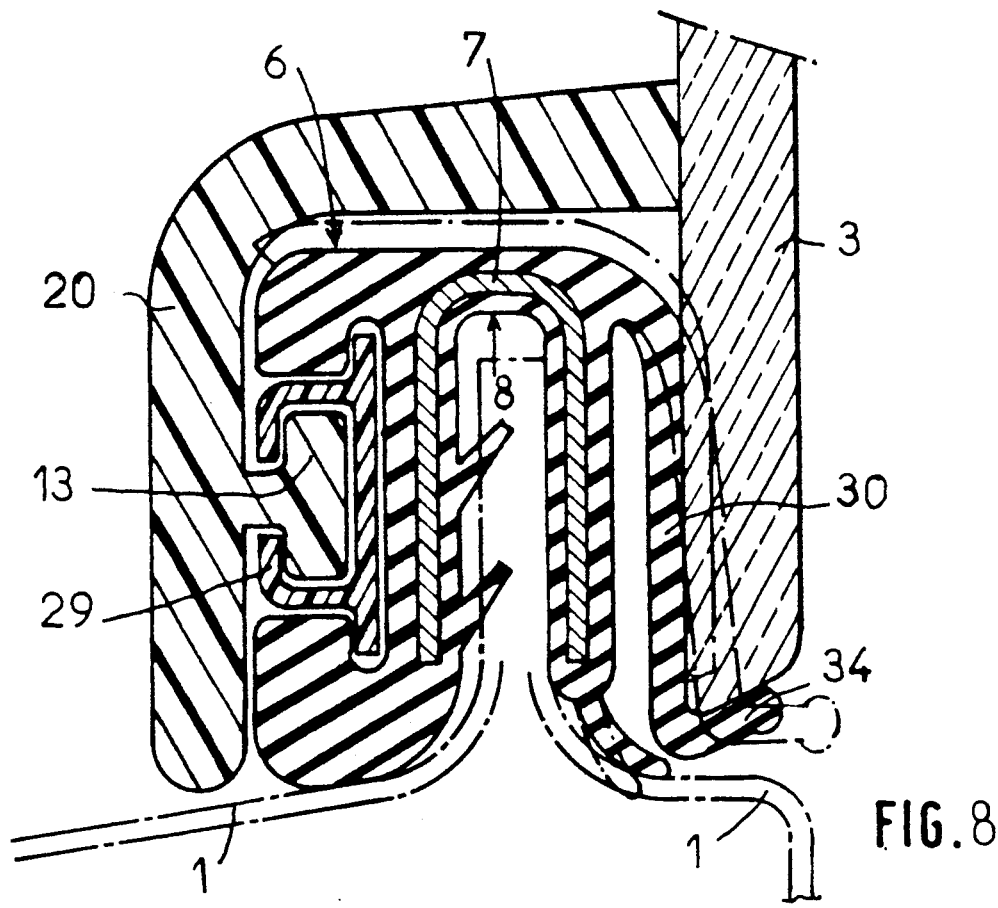

FIG. 8 illustrates another alternative version similar to that of FIG. 7, the only difference being that the part 21 of the section on which the edge of the pane 3 bears is replaced by a simple lip 34 which is of a profile complementary with that of the edge of the pane and is joined by means of a flexible strip 30 to the base of the U-shaped part 8 of the section and which, when the pane 3 is in the closing position, is laid against the contiguous face of this pane, as can be seen in the drawing.

Figure 9:
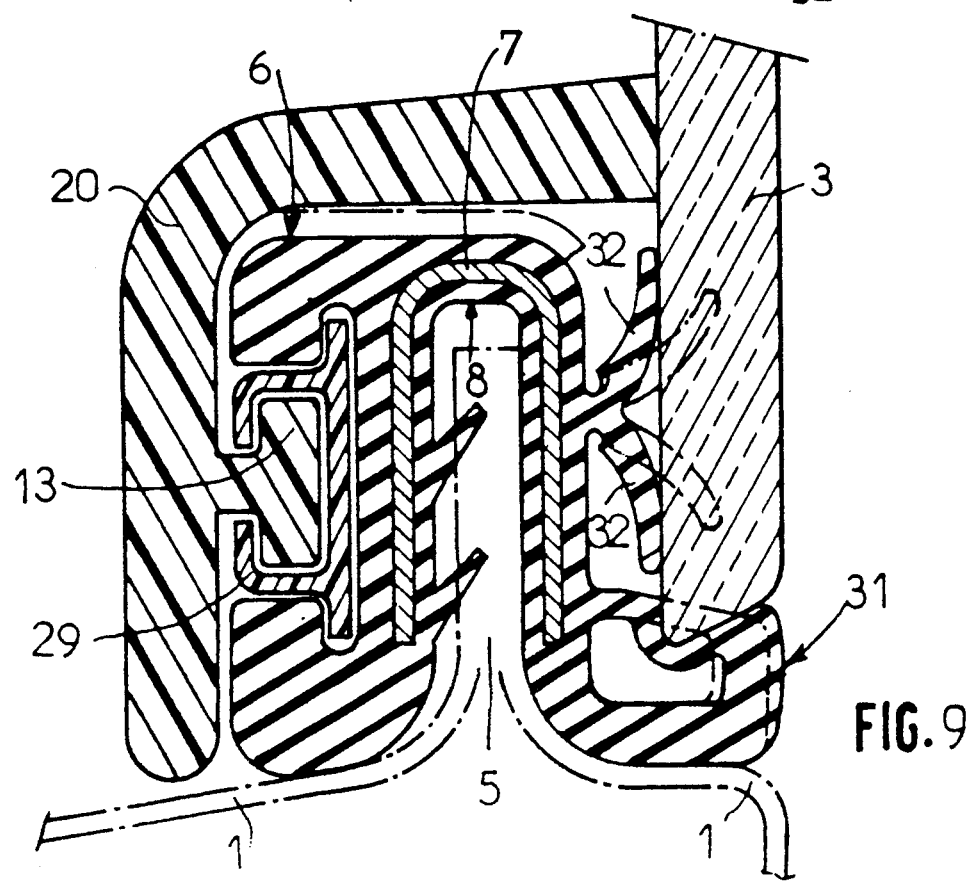

Finally, in the embodiment of FIG. 9 which is likewise similar to that of FIG. 7, in the closing position of the pane 3 the bevelled edge of the latter bears, thereby deforming it, against a tubular part 31 joined to the end of that branch of the U-shaped part 8 of the section facing outwards, whilst lips 32 joined to the middle part of this same branch are laid against the contiguous face of the pane.

In all these embodiments, the invention therefore affords a means, simple and easy to put into effect, for guiding a movable flush glass during its movements and for ensuring sealing in the region of this glass when the latter is in the closed position.

We claim:

1. A movable flush-glass system (3) for an automobile door comprising two metal panels (1) which are fixed to one another and between which this movable glass can be retracted, and a glass frame obtained from the said panels or fixed to these, this frame defining with the panels an aperture (4) intended to be closed off by the movable glass and comprising, on the sides of the aperture other than that on which the glass can be retracted between the panels, a rebate (5) projecting in the direction of the aperture, this glass system being characterized in that there is fastened to the inner face of the pane (3), in the vicinity of an edge of the latter contiguous with a vertical member (10) of the frame and substantially level with the upper edge of this pane, a rigid element (20) having such a form and/or being so fastened to the pane that it defines, with the contiguous portion of the periphery of the pane, a channel of U- shaped cross-section which caps an elastomeric section (6) which itself caps the rebate (5) of the door frame, in order laterally to ensure the guidance and sealing closure of the pane, whilst the edge (11) of this pane (3), at least in the upper part of the latter, is arranged obliquely relative to its faces, thus forming an acute angle with the inner face, opposite a part of the section against which it comes to bear in the closing position.

2. A system according to claim 1, characterized in that the edge (11) in the glass, inclined obliquely relative to the faces of the latter, extends over the entire periphery of this glass.

3. The system according to claim 1, characterized in that the part (21, 29) of the section (6) on which the pane (3) comes to bear in the closing position has a form complementary with that of the edge (11) of this pane.

4. The system according to one of claims 1 to 3, characterized in that the part (21, 31) against which the pane (3) bears in the closing position has a tubular cross-section.

5. The system according to claim 4, characterized in that the part (27) against which the pane bears in the closing position is made of a deformable material.

6. The system according to claim 5, characterized in that the surfaces of the part (11) of the section intended for coming in contact with the glass (3) are covered with a film of a material of low coefficient of friction (12), a fabric or flocked fibers.

7. The system according to claim 6, characterized in that the section (6) is equipped, on the side located towards the inside of the vehicle, with a slideway (14, 29), in which a shoe (13) integral with the rigid element (20) or a part (20a) of this element (20) is engaged so a to be capable of sliding therein during the movement of the glass.

8. The system according to claim 7, characterized in that the member forming a slideway (14, 29) is fixed to the section (6) by snapping into grooves (25) of the section.

9. A pane for an automobile door, characterized in that is possesses a rigid element 20 on one face of the pane, in the immediate vicinity of only one lateral edge of the pane fastened to the pane (3) such that it defines, with a contiguous portion of the periphery of the latter, a U-shaped channel and guides the entire pane from said only one lateral edge while the said contiguous edge (11) is arranged obliquely relative to the faces, forming an acute angle with the face carrying the said rigid element (20), thus creating a superior seal of a pane with an elastomeric section on a door of an automobile.

10. The pane according to claim 9, characterized in that a show (13) is provided on a part of the ridged element (20) facing towards the glass.

11. The pane according to claim 9, wherein a part of the rigid element (20) is profiled in the form of a guide shoe.

12. A reinforced elastomeric section, including a reinforcing member extending entirely over a rebate of the window frame of an automobile door and which caps said rebate by means of a component (8) of U-shaped cross-section, characterized in that it possesses a sealing component adjoining a branch of the component (8) and of such a form that it can receive an edge (11) of a pane, inclined relative to one of its faces, such that a superior seal is formed with said elastomeric section, when this pane is in the closing position.

13. The section according to claim 12, characterized in that said sealing component (21, 34) has a form complementary with that of the edge of the pane (3).

14. The section according to claim 12, characterized in that said sealing component (21, 31) of the section has a tubular cross-section.

15. The section according to claim 12, characterized in that said component of the section is made of a deformable material.

16. The section according to one of claims 12 to 15, characterized in that the outer surface of the section coming in contact with the pane (3) is covered with a product of low coefficient of friction, a fabric or flocked fibers.

17. The section according to claim 16, characterized in that a branch of the part of U-shaped cross-section facing towards the inside of a vehicle is equipped with a member forming a slideway (14, 29).

* * * * *